(12) United States Patent
Eidson

(10) Patent No.: US 6,278,710 B1
(45) Date of Patent: Aug. 21, 2001

(54) ENHANCEMENTS TO TIME SYNCHRONIZATION IN DISTRIBUTED SYSTEMS

(75) Inventor: John C. Eidson, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/151,017

(22) Filed: Sep. 10, 1998

(51) Int. Cl.[7] .............................. H04L 12/56; H04J 3/06
(52) U.S. Cl. .................. 370/394; 390/503; 390/516; 375/371
(58) Field of Search ............................ 703/503; 370/514, 370/520, 516, 394, 509, 518, 510, 512; 375/371, 373, 376, 364; 395/200, 550

(56) References Cited

U.S. PATENT DOCUMENTS

| 4,890,222 | * | 12/1989 | Kirk | 364/200 |
| 5,392,421 | * | 2/1995 | Lennartsson | 395/550 |
| 5,537,549 | * | 7/1996 | Gee et al. | 395/200 |
| 5,640,388 | * | 6/1997 | Woodhead et al. | 370/516 |
| 5,896,427 | * | 4/1999 | Muntz et al. | 37/516 |

* cited by examiner

*Primary Examiner*—Alpus H. Hsu
*Assistant Examiner*—Afsar M. Qureshi (57) ABSTRACT

A variety of enhancements to a time synchronization protocol for a distributed system including techniques for improving accuracy by separating a unique timing point from a delimiter for the timing data packet. The enhancements include techniques that compensate for jitter associated with communication circuitry in the distributed system including jitter associated with physical interfaces and gateways in the distributed system. These techniques may involve specialized circuitry in the communication circuitry to compensate for jitter or special processing of received timing data packets or the introduction of follow up packets that inform receiving nodes of measured jitter or a combination of these techniques.

10 Claims, 7 Drawing Sheets

ENHANCEMENTS TO TIME SYNCHRONIZATION IN DISTRIBUTED SYSTEMS

BACKGROUND OF THE INVENTION

1. Field of Invention

The present invention pertains to the field of distributed systems. More particularly, this invention relates to enhancements to time synchronization in distributed systems.

2. Art Background

Distributed systems are commonly arranged as a collection of nodes which are interconnected via one or more network communication links. These network communication links may be packetized links such as Ethernet or one or more of a variety of other packetized links that are adapted to distributed control system applications.

Distributed control systems commonly benefit from precise control of the timing at the distributed nodes. U.S. Pat. No. 5,566,180 of Eidson et. al. teaches a method and apparatus for providing precise control of timing in distributed nodes by synchronizing the local clocks in the distributed nodes. The synchronization protocol of Eidson et. al. involves the exchange of timing data packets and follow up packets among the nodes so that the delay in the transfer of a timing data packet from a first node to a second node in combination with timing information in a follow up packet can be used to accurately adjust a local clock in the second node.

A variety of conditions that are commonly found in distributed systems may introduce variation or jitter in the delay in the transfer of a timing data packet. For example, communication circuitry at various points in the distributed system may introduce jitter. In addition, communication circuits such as gateways can introduce jitter that depends on the volume of traffic in the system. Unfortunately, such jitter may reduce the accuracy of time synchronization in a distributed system.

SUMMARY OF THE INVENTION

A variety of enhancements to a time synchronization protocol for a distributed system are disclosed. The enhancements may be embodied in a distributed system which includes a first node and a second node and one or more intervening communication links that may includes communication devices such as repeaters or gateways. The first node includes a local clock and circuitry that generates a timing data packet and a follow up packet. The timing data packet has a unique timing point and the follow up packet includes a time-stamp obtained from the local clock that indicates a time at which the timing data packet is generated. The second node includes circuitry that receives the timing data packet and the follow up packet via a communication link. The second node further includes a local clock and circuitry that obtains a local time value from the local clock when the unique timing point is detected. The difference between the time-stamp from the follow up packet and the local time value indicates a relative synchronization of the local clocks in the first and second nodes.

The enhancements disclosed herein include techniques for improving the accuracy in time synchronization by separating the unique timing point from a delimiter for the timing data packet. The enhancements include techniques that compensate for jitter associated with communication circuitry in the distributed system including jitter associated with physical interfaces and gateways in the distributed system. These techniques may involve specialized circuitry in the communication circuitry to compensate for jitter or special processing of received timing data packets or the introduction of follow up packets that inform receiving nodes of measured jitter or a combination of these techniques.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
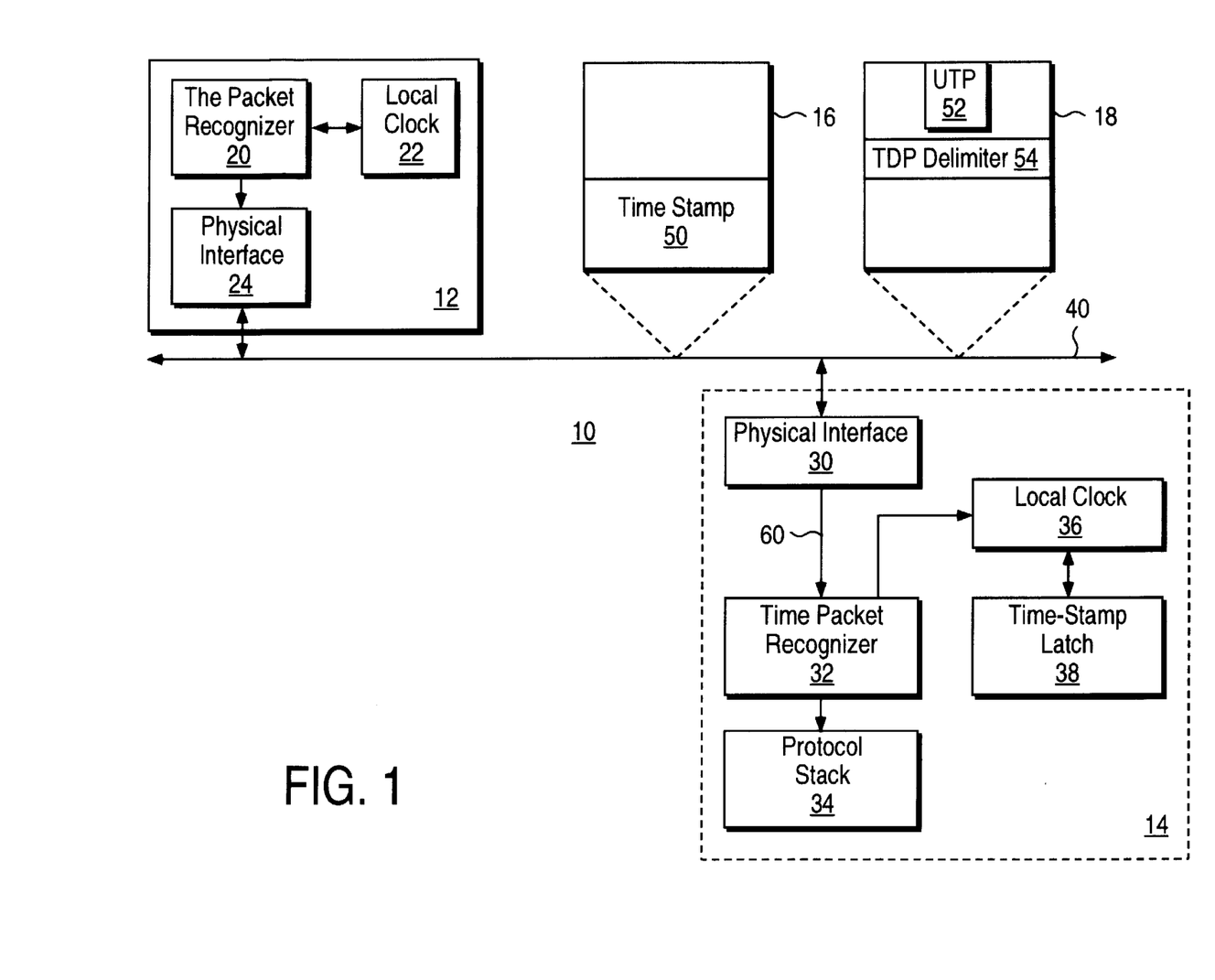
FIG. 1 shows a distributed system which includes a pair of nodes interconnected via a communication link.

FIG. 1 shows a distributed system 10 which includes a pair of nodes 12 and 14 interconnected via a communication link 40. The nodes 12 and 14 include a pair of local clocks 22 and 36, respectively, which keep local time for the respective nodes 12 and 14. The nodes 12 and 14 also include a pair of time packet recognizers 20 and 32, respectively, which exchange messages via the communication link 40 to maintain synchronization of the local clocks 22 and 36.

For example, the time packet recognizer 20 generates a timing data packet 18 and transfers it via the communication link 40 through a physical interface 24 that enables communication via the communication link 40. The timing data packet 18 includes a unique timing point (UTP) 52 and a timing data packet (TDP) delimiter 54. At the time that the time packet recognizer 20 transfers the timing data packet 18 to the physical interface 24 it samples the local clock 22 to obtain a time-stamp 50. The time-stamp 50 indicates the local time in the node 12 at which the time packet recognizer 20 transferred the timing data packet 18 to the physical interface 24. Thereafter, the time packet recognizer 20 generates a follow up packet 16 and transfers it via the communication link 40. The follow up packet 16 includes the time-stamp 50.

The time packet recognizer 32 receives the timing data packet 18 through a physical interface 30 that enables communication via the communication link 40. The physical interface 30 generates a set of recovered signals 60 in response to the reception of the timing data packet 18. The recovered signals 60 include a recovered bit stream which carries the elements of the timing data packet 18 including the UTP 52 and the TDP delimiter 54. The recovered signals 60 include a recovered clock signal for the recovered bit stream.

In one embodiment, the time packet recognizer 32 uses the recovered signals 60 to detect the UTP 52. Upon detection of the UTP 52 in the recovered bit stream, the time packet recognizer 32 causes a time-stamp latch 38 to latch a local time value from the local clock 36. Thereafter, the time packet recognizer 32 verifies whether the timing data packet 18 contains the TDP delimiter 54. The TDP delimiter 54 is a unique pattern that distinguishes timing data packets from other types of packets carried on the communication link 40. If the TDP delimiter 54 is not found in the packet 18 then the packet 18 is not a timing data packet and the time packet recognizer 32 discards the time value just latched by the time-stamp latch 38.

In another embodiment, the UTP 52 precedes the TDP delimiter 54 in the timing data packet 18. In yet another embodiment, the UTP 52 and the TDP delimiter 54 are merged into the same indicator in the timing data packet 18.

The time value held in the time-stamp latch 38 indicates the local time at which the time packet recognizer 32 received the timing data packet 18. Thereafter, the time packet recognizer 32 receives the follow up packet 16 and extracts the time-stamp 50. The difference between the time-stamp 50 and the time value in the time-stamp latch 38 indicates the relative synchronization of the local clocks 22 and 36. Once this difference is computed the time packet recognizer 32 uses it to adjust the time value in the local clock 36 to conform the local clock 36 to the local clock 22.

The adjustment of the time value in the local clock 36 may be accomplished by implementing the local clock 36 as a counter driven by an oscillator with sufficient stability. The least significant few bits of the counter may be implemented as an adder so that the increment on oscillator periods may be occasionally increased or decreased to effectively speed up or slow down the local clock 36 in accordance with the results of the computation of the difference between the time-stamp 50 and the time value held in the time-stamp latch 38.

The nodes 12 and 14 may be any type of node in the distributed system 10. For example, any one or both of the nodes 12 and 14 may be a sensor node or an actuator node or an application controller node or a combination of these in a distributed control system. Any one or more of the nodes 12 and 14 may be a computer system such as a personal computer.

The communication link 40 may be implemented with one or more of a variety of communication mechanisms. In one embodiment, the communication link 40 is an Ethernet communication network. In another embodiment, the communication link 40 is a LonTalk field-level control bus which is specialized for the process control environment. In other embodiments, the communication link 40 may be implemented with time division multiple access (TDMA) or token ring protocols to name only a few possibilities.

In one embodiment, the UTP 52 is a start-of-frame (SOF) delimiter which marks the end of a preamble portion of the packet 18. The SOF delimiter is a predefined bit pattern which depends on the particular communication protocol being used on the communication link 40.

In one embodiment, the TDP delimiter 54 is a unique multi-cast address which is allocated for timing data packets. In other embodiments, timing data packets are delimited by mechanisms such as differing carrier frequencies, coding methods, or transmission paths from the carrier frequencies, coding methods, or transmission paths used by other packets.

The physical interface 30 includes a phase lock loop circuit and may also include a squelch circuit each of which may introduce jitter in the recovered signals 60 received by the time packet recognizer 32. This jitter may cause inaccuracies in the detected time of the UTP 52 by the time packet recognizer 32 which can reduce the overall accuracy of synchronization between the local clocks 22 and 36 which may be obtained by the above technique.

One method for reducing the negative effects of jitter introduced by the physical interface 30 is to average the differences computed between the time value in the time-stamp latch 38 and the time-stamp 50 for a number of timing data packet and corresponding follow up packet pairs. This computed average may then be used to adjust the local clock 36.

For example, the time packet recognizer 20 may generate a timing data packet once per second along with a corresponding follow up packet. The time packet recognizer 32 latches a time value from the local clock 36 upon detection of each UTP of the received timing data packets and then computes a difference between the latched time value and the time-stamp contained in the corresponding follow up packet. These differences are then averaged for, for example, 10 timing data packets, and the averaged result is then used to adjust the local clock 36. The averaging may be performed by the time packet recognizer 32 or by processor associated with the protocol stack 34.

This averaging technique may also be used if repeaters or gateways or similar communication devices are interposed between the nodes 12 and 14. The averaging would reduce the effects of jitter associated with these types of intervening communication devices.

Figure 2:
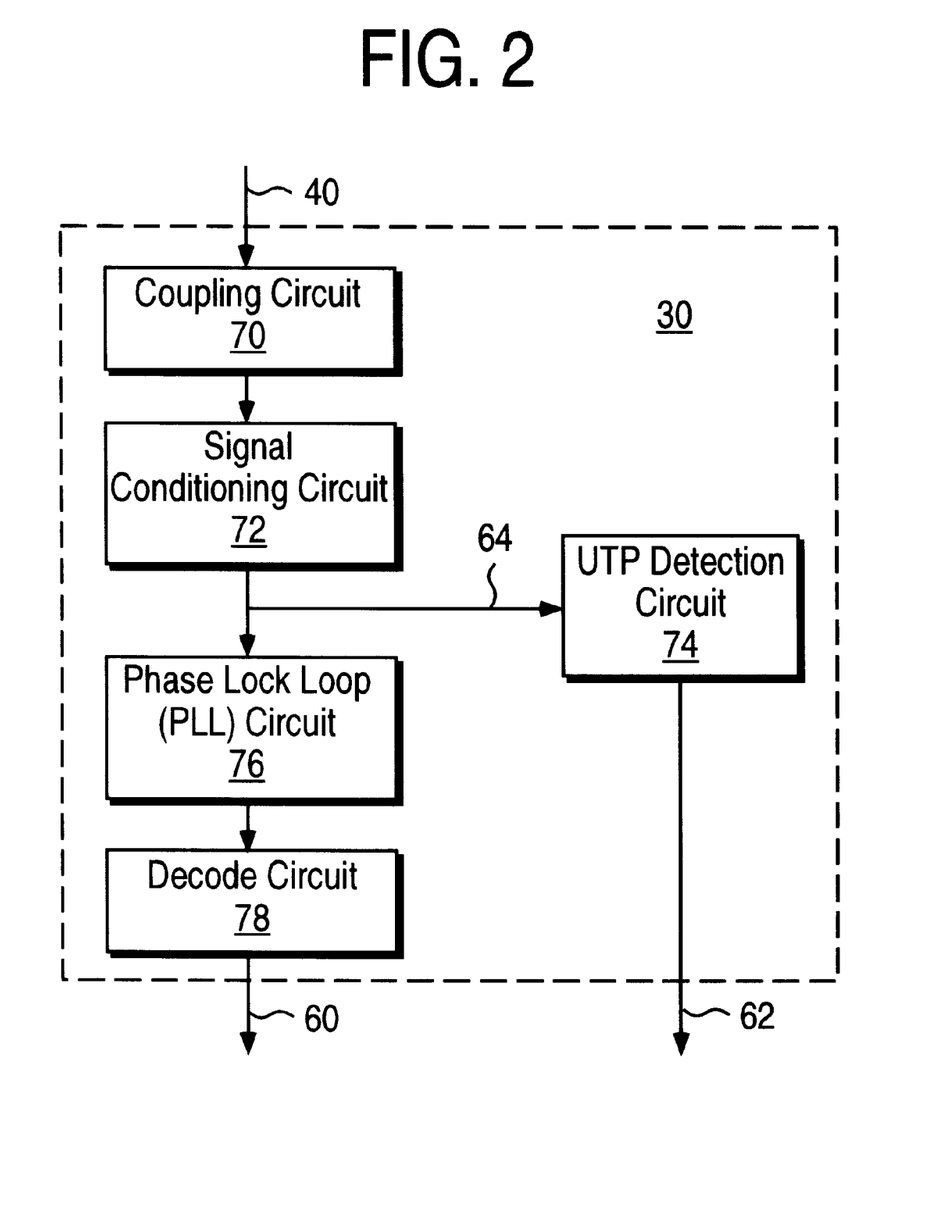
FIG. 2 shows an embodiment of a physical interface which includes a UTP detection circuit that improves accuracy in the synchronization of the local clocks by reducing jitter in the detection of the UTP.

FIG. 2 shows an embodiment of the physical interface 30 which includes a UTP detection circuit 74 that improves accuracy in the synchronization of the local clocks 22 and 36 by reducing jitter in the detection of the UTP 52. The receiving side of the physical interface 30 includes a coupling circuit 70 such as a transformer, a signal conditioning circuit 72, a phase lock loop (PLL) circuit 76, and a decode circuit 78.

The PLL circuit 76 receives a raw incoming bit stream 64 from the signal conditioning circuit 72 and generates the recovered clock signal of the recovered signals 60. The decode circuit 78 uses the recovered clock signal to obtain the recovered bit stream of the recovered signals 60. The recovered bit stream is in phase with a local oscillator of the physical interface 30 and this local oscillator usually drifts with respect to the phase of the local oscillator in the physical interface 24. This phase variation may produce jitter in the detection point of the UTP 52 if the recovered signals 60 are used to detect the UTP 52.

Instead, the UTP detection circuit 74 detects the UTP 52 from the raw incoming bit stream 64, thereby eliminating the jitter associated with the recovered signals 60. The UTP detection circuit 74 provides a UTP detection signal 62 to the time packet recognizer 32 which causes it to latch a time value from the local clock 36 when the UTP 52 is detected.

Figure 3:
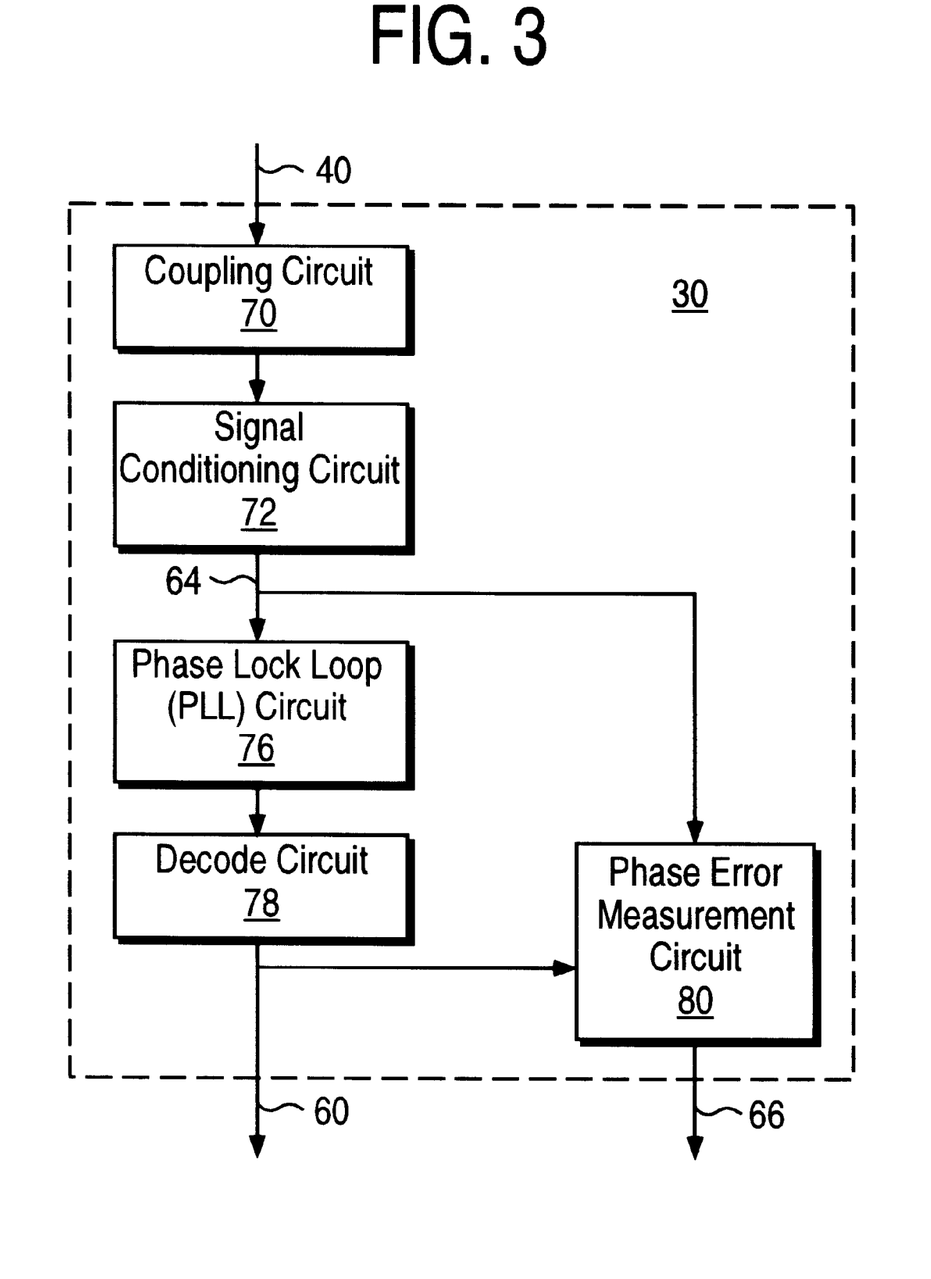
FIG. 3 shows an alternative embodiment of a physical interface which includes a phase error measurement circuit that improves accuracy in the synchronization of the local clocks by reducing jitter in the detection of the UTP.

FIG. 3 shows an alternative embodiment of the physical interface 30 which includes a phase error measurement circuit 80 that improves accuracy in the synchronization of the local clocks 22 and 36 by reducing jitter in the detection of the UTP 52. The phase error measurement circuit 80 measures the difference in phase between the raw incoming bit stream 64 and the recovered signals 60. The phase error measurement circuit 80 provides the time packet recognizer 32 with a phase error signal 66 that indicates the difference in phase. The time packet recognizer 32 then uses the phase error signal 66 to correct the time at which it detects the UTP 52.

The phase error measurement circuit 80 may be implemented with a circuit that triggers a pulse by detecting threshold levels of the raw incoming bit stream 64. The phase of this triggered pulse is then compared to the phase of the recovered signals 60. Alternatively, the phase error measurement circuit 80 may include a mixer that measures the phase error.

Figure 4:
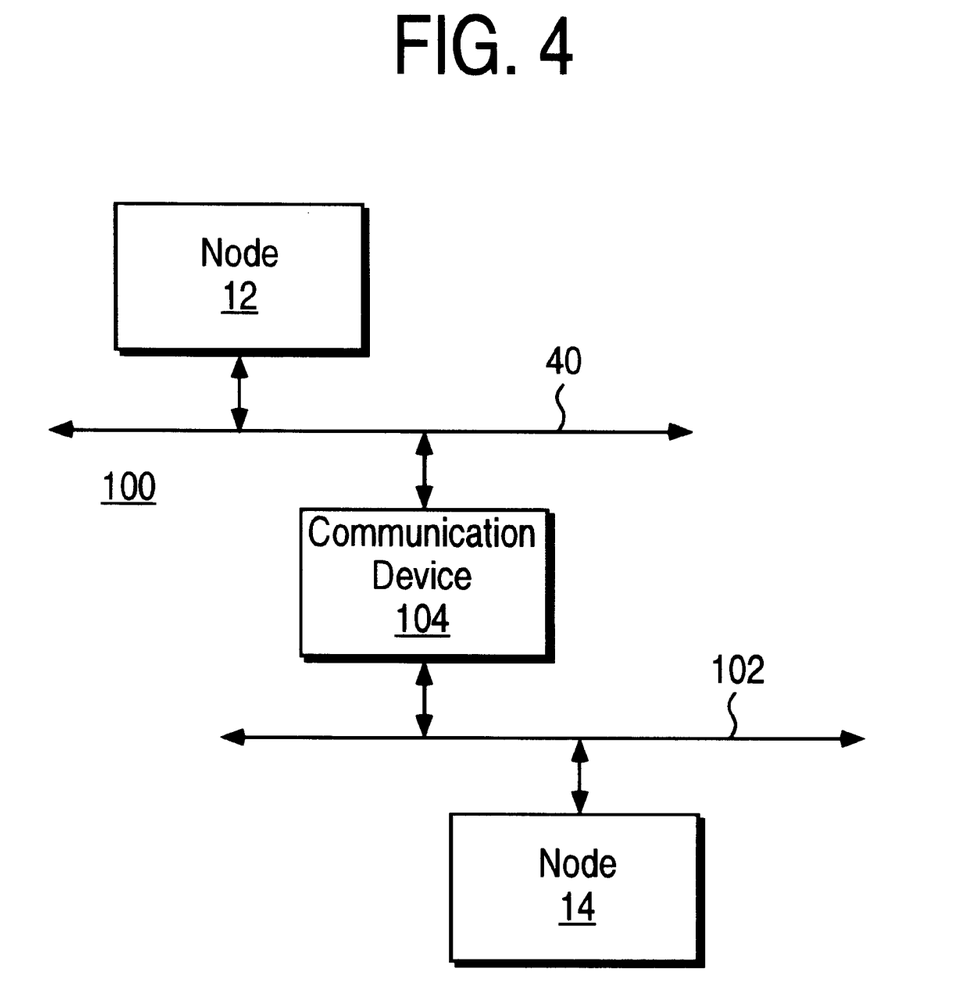
FIG. 4 shows a distributed system in which nodes are coupled to different communication links interconnected by a communication device.

FIG. 4 shows a distributed system 100 in which the nodes 12 and 14 are coupled to different communication links, the communication link 40 and a communication link 102, respectively. A communication device 104 provides communication between nodes connected to the communication link 40 and nodes connected to the communication link 102. The communication device 104 receives timing data packets and follow up packets and other packets from the node 12 via the communication link 40 and transfers them to the node 14 via the communication link 102. The communication device 104 may be a repeater or a switching hub or a gateway or other similar type of device.

The communication device 104 introduces a delay in the transfer of each packet from the communication link 40 to the communication link 102 including the timing data packets. The amount of delay varies depending upon the implementation of the communication device 104 and network load factors. For example, if the communication device 104 is a repeater it may contain phase lock loop or squelch circuitry that introduces delay. If the communication device 104 is a gateway it may contain buffers whose delay depends on the amount of traffic being routed through the gateway at a particular time. Variations in this delay reduces the accuracy of time synchronization between the local clocks 20 and 36 by introducing jitter into the times at which the UTPs of timing data packets are received by the time packer recognizer 32.

One method for reducing the effects of the jitter associated with the communication device 104 is for the time packet recognizer 32 to ignore the received timing data packets that have delay greater than a minimum determined delay. For example, the time packet recognizer 32 may receive multiple pairs of timing data packets and corresponding follow up packets and compute corresponding differences between the detected UTP time of each timing data packet and the time-stamp of the corresponding follow up packet. The minimum difference should be the delay associated with the communication device 104 when its buffers are empty. The jitter and delay introduced by the communication device 104 when its buffers are empty is likely to be much less than when its buffers are active. The time packet recognizer 32 ignores any timing data packets that have a substantially greater delay than this minimum delay by discarding the corresponding latched local time values and not making any local clock adjustments in response to the timing data packets that are ignored. This prevents adjustments to the local clock 36 which are based on excessive jitter in the communication device 104.

Figure 5:
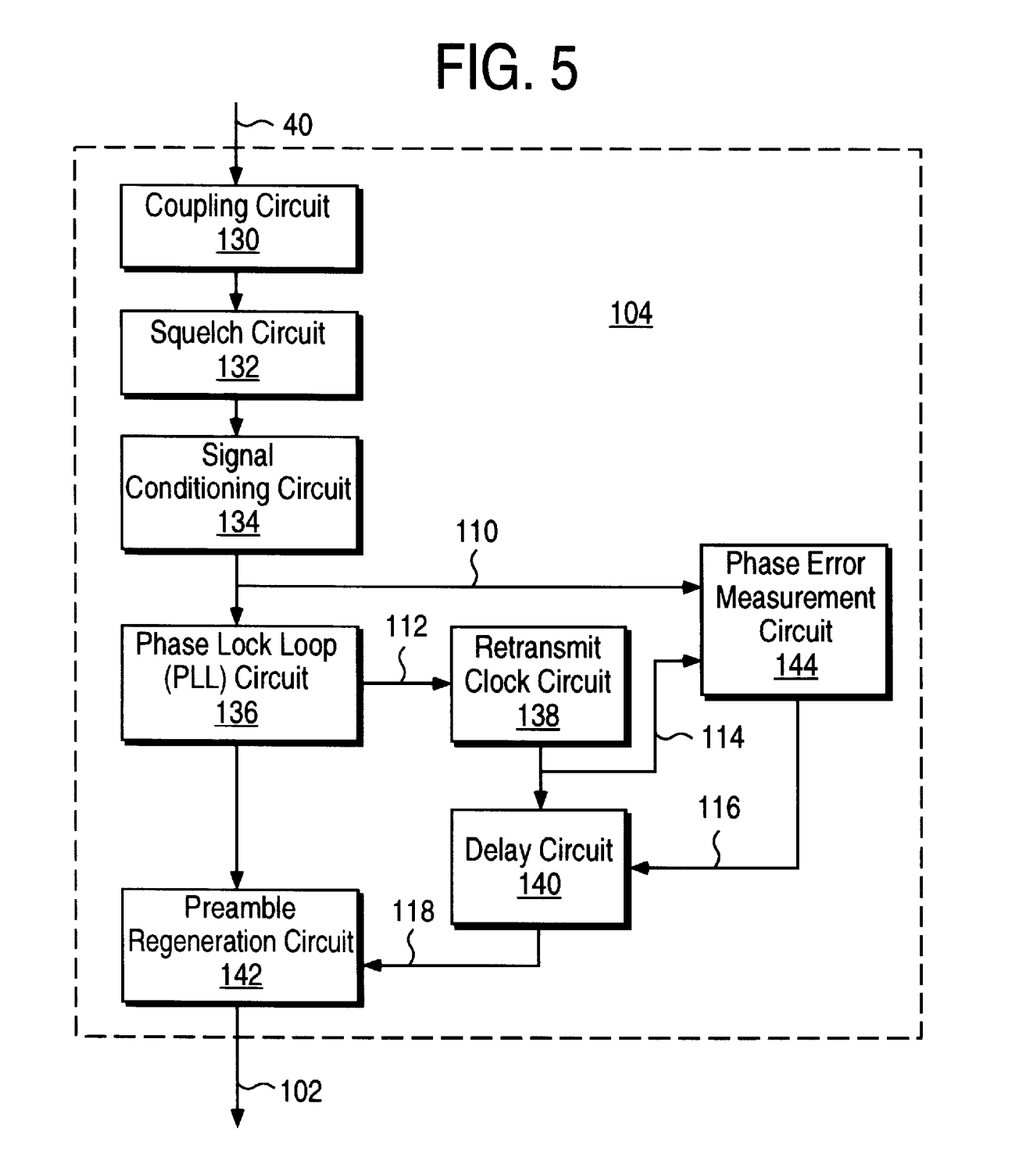
FIG. 5 shows an embodiment of a communication device which includes mechanisms for reducing time synchronization inaccuracies caused by jitter.

FIG. 5 shows an embodiment of the communication device 104 which includes mechanisms for reducing time synchronization inaccuracies caused by jitter. The communication link 40 to communication link 102 path of the communication device 104 in this embodiment includes a coupling circuit 130, a squelch circuit 132, a signal conditioning circuit 134, a phase lock loop (PLL) circuit 136, a retransmit clock 138, and a preamble regeneration circuit 142.

Packets such as the timing data packet 18 and the follow up packet 16 are received via the communication link 40 by the coupling circuit 130. After the coupling circuit 132 and the squelch circuit 132, the PLL circuit 136 receives a raw incoming bit stream 110 which carries a received packet. The PLL circuit 136 generates a recovered clock signal 112 in response to the raw incoming bit stream 110. The retransmit clock circuit 138 uses the recovered clock signal 112 to derive a retransmit clock signal 114.

The retransmit clock signal 114 includes jitter caused by the PLL circuit 138 and this jitter would reduce the accuracy of the UTP detection in the node 14 if the retransmit clock signal 114 were used to drive the preamble regeneration circuit 142. Instead, this jitter is reduced by a phase error measurement circuit 144 and a delay circuit 140.

The phase error measurement circuit 144 measures the phase difference between the raw incoming bit stream 110 and the retransmit clock signal 114 and generates a phase error signal 116 that indicates this difference. In response to the phase error signal 116, the delay circuit 140 delays the retransmit clock signal 114 to align its phase to the phase of the raw incoming bit stream 110. A delayed and phase aligned clock signal 118 is then provided to the preamble regeneration circuit 142.

The preamble regeneration circuit 142 regenerates preambles for packets relayed from the communication link 40 to the communication link 102. The preamble regeneration circuit 142 also relays the bit stream for received packets onto the communication link 102. The preamble and relayed packet bit stream are aligned to the phase of the clock signal 118.

Figure 6:
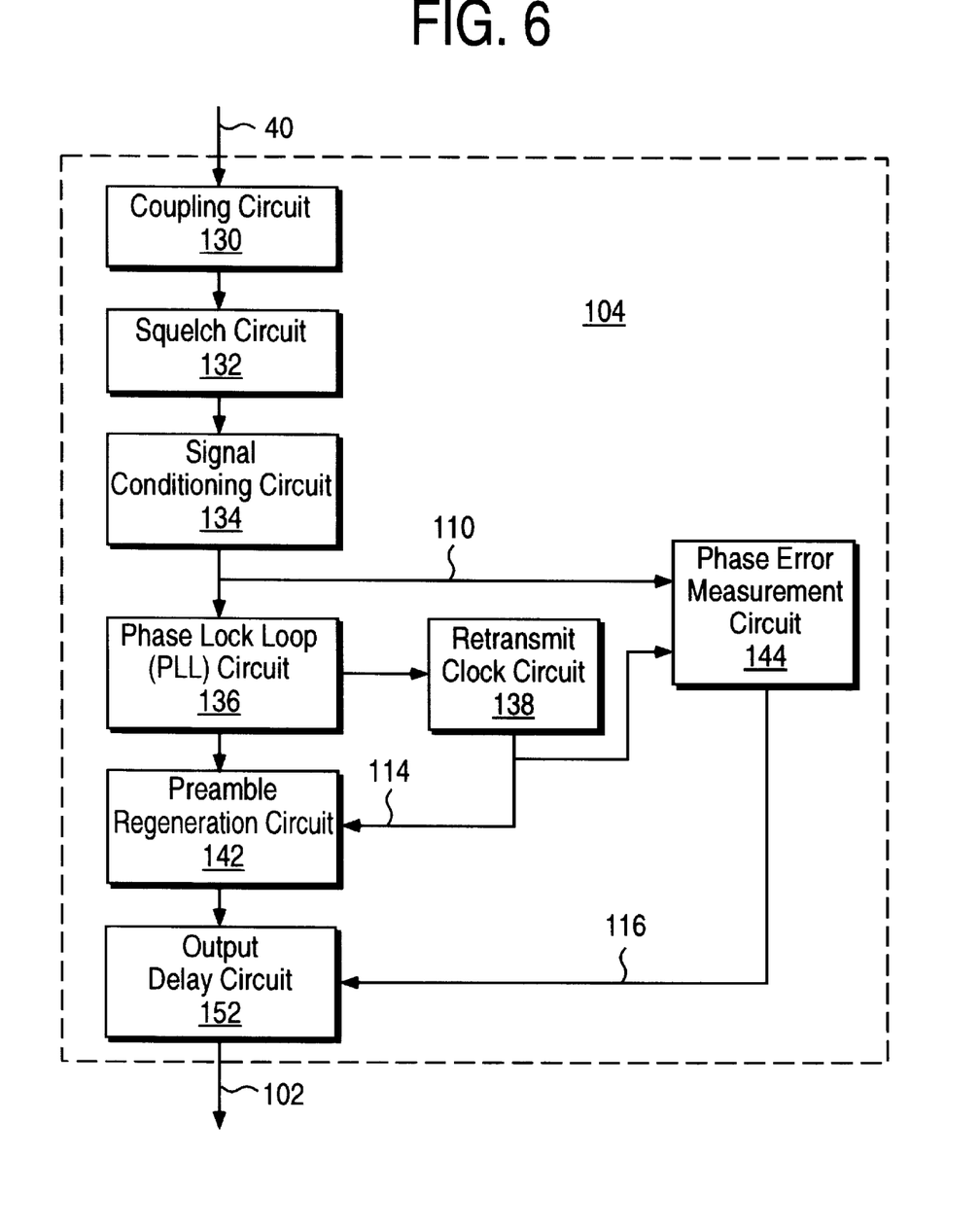
FIG. 6 shows an alternative embodiment of a communication device which includes mechanisms for reducing time synchronization inaccuracies caused by jitter.

FIG. 6 shows an alternative embodiment of the communication device 104 which includes mechanisms for reducing time synchronization inaccuracies caused by jitter. In this embodiment, the output of the preamble regeneration circuit 142 is clocked by the retransmit clock 114 and is delayed by an output delay circuit 152. The amount of delay introduced by the output delay circuit 152 is controlled by the phase error signal 116 so that the output from the output delay circuit 152 is aligned in phase with the raw incoming bit stream 110.

The output delay circuit 152 may be implemented, for example, with a tapped delay line wherein the bit stream from the preamble generation circuit 142 is steered through the appropriate tapped delay line by the phase error signal 116.

Figure 7:
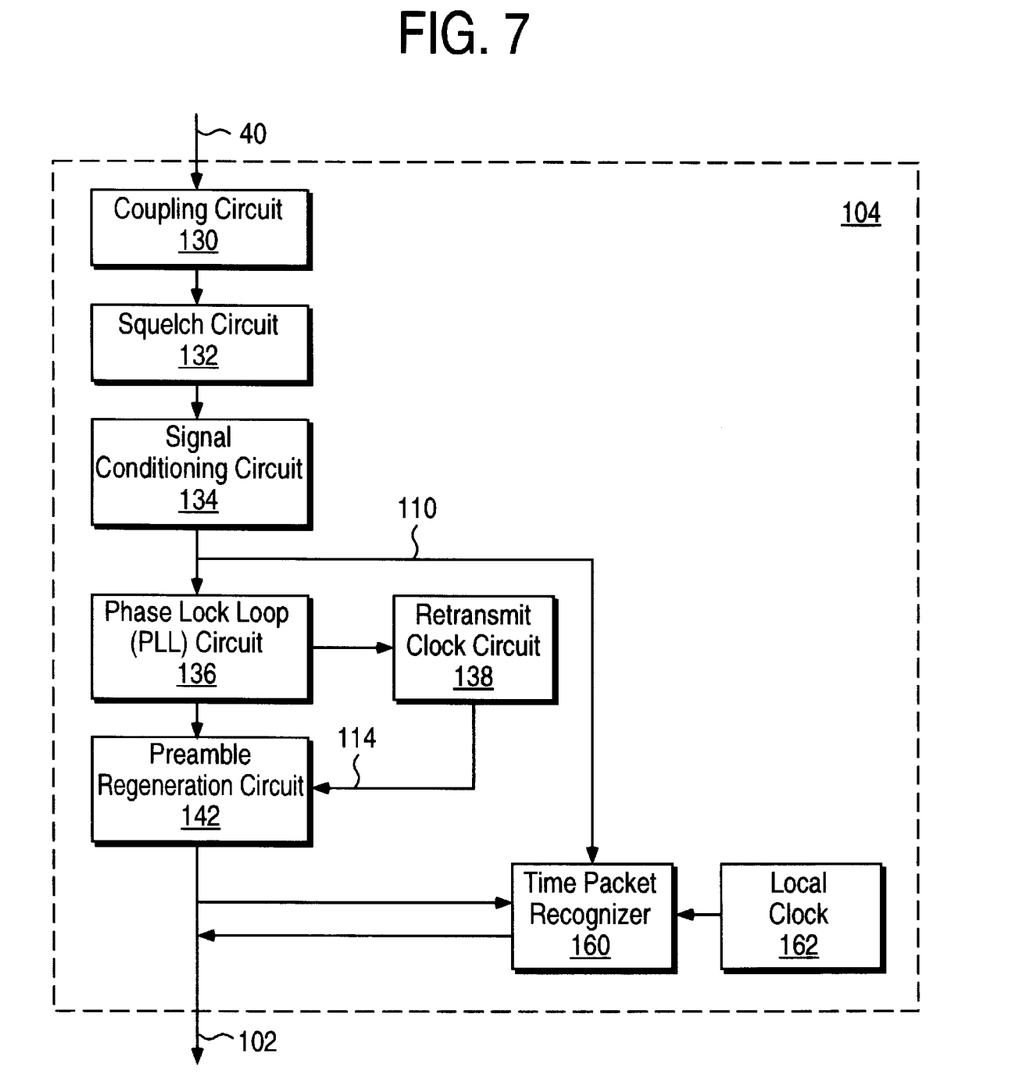
FIG. 7 shows an embodiment of a communication device which includes mechanisms for measuring the delay introduced in the communication device and for passing the measured delay onto a node in a follow up packet.

FIG. 7 shows an embodiment of the communication device 104 which includes mechanisms for measuring the delay introduced in the communication device 104 and for passing the measured delay onto the node 14 in a follow up packet. The communication device 104 includes a time packet recognizer 160 that detects the UTP 52 in the raw incoming bit stream 110 and that detects the UTP 52 in the output bit stream on the communication link 102. The time packet recognizer 160 obtains a time value from a local clock 162 when it detects the UTP 52 in the raw incoming bit stream 110 and obtains a time value from the local clock 162 when it detects the UTP 52 on the communication link 102. The difference in these time values is the delay associated with the communication device 104.

The time packet recognizer 160 generates a follow up packet that contains the delay associated with the communication device 104 and transfers it via the communication link 102. The time packet recognizer 32 obtains this follow up packet and uses the delay associated with the communication device 104 to correct the difference between the time-stamp 50 and the time value in the time-stamp latch 38 when adjusting the local clock 36.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A distributed system, comprising:

first node having a local clock and circuitry that generates a timing data packet and a follow up packet, the timing data packet having a unique timing point and a delimiter and the follow up packet having a time-stamp obtained from the local clock that indicates a time at which the timing data packet is generated;

second node having circuitry that receives the timing data packet and the follow up packet via the communication link, the second node having a local clock and circuitry that obtains a local time value from the local clock when the unique timing point is detected and that discards the local time value if the delimiter is not detected, such that a difference between the time-stamp of the follow up packet and the local time value if not discarded indicates a relative synchronization of the local clocks, the second node having circuitry for adjusting the local time value in the local clock in response to the difference.

2. The distributed system of claim 1, wherein the circuitry that receives the timing data packet comprises:

signal conditioning circuit that generates a raw bit stream in response to the timing data packet;

phase lock loop circuit that recovers a clock signal from the raw bit stream;

circuitry generates a detection signal by detecting the unique timing point in the raw bit stream such that the detection signal reduces jitter in the detection of the unique timing point that is associated with the phase lock loop circuit.

3. The distributed system of claim 1, wherein the circuitry that receives the timing data packet comprises:

signal conditioning circuit that generates a raw bit stream in response to the timing data packet;

circuitry that generates a set of recovered signals from the raw bit stream;

circuitry generates a phase error signal that indicates a phase difference between the raw bit stream and the recovered signals such that the phase error signal enables a correction for jitter associated with the recovered signals.

4. The distributed system of claim 1, wherein the second node receives a series of timing data packets and corresponding follow up packets via the communication link and further comprises means for determining an average of a set of differences between a series of time values obtained from the local clock in response to the series of timing data packets and a corresponding series of time-stamps contained in the corresponding follow up packets such that the average indicates a relative synchronization of the local clocks of the first and second nodes.

5. A distributed system, comprising:

first node coupled to a first communication link and having circuitry that generates a timing data packet that includes a unique timing point and circuitry that transfers the timing data packet via the first communication link;

second node having circuitry for receiving the timing data packet via a second communication link and circuitry for detecting the unique timing point and for determining a delay between a time at which the first node generated the timing data packet and a time at which the unique timing point is detected at the second node, the second node having a local clock and circuitry for adjusting a time value in the local clock in response to the delay;

communication circuit that transfers the timing data packet between the first communication link and the second communication link, the communication circuit having means for reducing an inaccuracy in the delay between the time at which the first node generated the timing data packet and the time at which the unique timing point is detected at the second node wherein the inaccuracy is caused by jitter introduced by the communication circuit.

6. The distributed system of claim 5, wherein the means for reducing an inaccuracy in the delay comprises:

signal conditioning circuit that generates a raw bit stream in response to the timing data packet;

phase lock loop circuit that generates a recovered clock signal from the raw bit stream;

circuitry that determines a phase error between the recovered clock signal and the raw bit stream and that generates a delayed clock signal in response to the phase error and the recovered clock signal such that delayed clock signal is aligned to the raw bit stream;

circuitry that regenerates a preamble for transferring the timing data packet over the second communication link such that the preamble is aligned to the delay ed clock signal.

7. A distributed system, comprising:

first node coupled to a first communication link and having circuitry that generates a timing data packet that includes a unique timing point and circuitry that transfers the timing data packet via the first communication link;

second node having circuitry for receiving the timing data packet via a second communication link and circuitry for detecting the unique timing point and for determining a delay between a time at which the first node generated the timing data packet and a time at which the unique timing point is detected at the second node;

communication circuit that transfers the timing data packet between the first communication link and the second communication link, the communication circuit having means for reducing an inaccuracy in the delay between the time at which the first node generated the timing data packet and the time at which the unique timing point is detected at the second node wherein the inaccuracy is caused by jitter introduced by the communication circuit wherein the means for reducing an inaccuracy in the delay comprises:

signal conditioning circuit that generates a raw bit stream in response to the timing data packet;

phase lock loop circuit that generates a recovered clock signal from the raw bit stream;

circuitry that determines a phase error between the recovered clock signal and the raw bit stream;

circuitry that regenerates a preamble for transferring the timing data packet over the second communication link;

circuitry that delays the preamble in response to the phase error such that the preamble transferred over the second communication link is aligned to the raw bit stream.

8. The distributed system of claim 5, wherein the means for reducing an inaccuracy in the delay includes circuitry that measures a delay introduced by the communication circuit and that transfers a follow up packet containing the delay introduced by the communication circuit to the second node via the second communication link such that the second node uses the delay introduced by the communication circuit to correct the delay between the time at which the first node generated the timing data packet and the time at which the unique timing point is detected at the second node.

9. A distributed system, comprising:

first node coupled to a first communication link and having circuitry that generates a timing data packet that includes a unique timing point and circuitry that transfers the timing data packet via the first communication link;

communication circuit that transfers the timing data packet between the first communication link and a second communication link;

second node having circuitry for receiving the timing data packet via the second communication link and circuitry for detecting the unique timing point and for determining a delay between a time at which the first node generated the timing data packet and a time at which the unique timing point is detected at the second node, the second node having circuitry for ignoring the timing data packet if the delay between the time at which the first node generated the timing data packet and the time at which the unique timing point is detected at the second node exceeds a minimum delay.

10. The distributed system of claim 9, wherein the second node further comprises means for determining the minimum delay by measuring a series of delays between a series of times at which the first node generated a series of timing data packets and a series of times at which a series of corresponding unique timing points are detected at the second node and then selecting a minimum of the series of delays.

* * * * *